(12) United States Patent
Kim et al.

(10) Patent No.: US 12,395,717 B2
(45) Date of Patent: Aug. 19, 2025

(54) CAMERA MODULE AND ELECTRONIC DEVICE INCLUDING THE SAME

(71) Applicant: Samsung Electronics Co., Ltd., Suwon-si (KR)

(72) Inventors: Jongjun Kim, Suwon-si (KR); Kiyun Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 17/959,758

(22) Filed: Oct. 4, 2022

(65) Prior Publication Data
US 2023/0164413 A1 May 25, 2023

Related U.S. Application Data

(63) Continuation of application No. PCT/KR2022/013790, filed on Sep. 15, 2022.

(30) Foreign Application Priority Data

Nov. 25, 2021 (KR) ........................ 10-2021-0164917
Jan. 21, 2022 (KR) ........................ 10-2022-0008968

(51) Int. Cl.
*H04N 23/55* (2023.01)
*H04M 1/02* (2006.01)
(Continued)

(52) U.S. Cl.
CPC .......... *H04N 23/55* (2023.01); *H04M 1/0264* (2013.01); *H04N 23/51* (2023.01); *H04N 23/54* (2023.01)

(58) Field of Classification Search
CPC ........ H04N 23/55; H04N 23/51; H04N 23/54; H04M 1/0264
(Continued)

(56) References Cited

U.S. PATENT DOCUMENTS

2006/0227236 A1 10/2006 Pak
2007/0117423 A1 5/2007 Kim et al.
(Continued)

FOREIGN PATENT DOCUMENTS

JP 2005-159187 6/2005
JP 2006-086913 3/2006
(Continued)

OTHER PUBLICATIONS

Search Report and Written Opinion dated Dec. 29, 2022 issued in International Patent Application No. PCT/KR2022/013790.
(Continued)

*Primary Examiner* — Joel W Fosselman
(74) *Attorney, Agent, or Firm* — Nixon & Vanderhye, P.C.

(57) ABSTRACT

According to various embodiments of the disclosure, a camera module and/or an electronic device including same may include: a sensor substrate, an image sensor disposed on one surface of the sensor substrate, a sensor enclosure disposed on the sensor substrate surrounding at least a part of the image sensor, and an optical element comprising a filter disposed in the sensor enclosure facing the image sensor, wherein the image sensor may be configured to detect light incident through the optical element, and the sensor enclosure may be attached to an edge of one surface of the image sensor, at least partially facing the optical element.

20 Claims, 14 Drawing Sheets

(51) Int. Cl.
*H04N 23/51* (2023.01)
*H04N 23/54* (2023.01)

(58) Field of Classification Search
USPC .......................................................... 348/374
See application file for complete search history.

(56) References Cited

U.S. PATENT DOCUMENTS

| | | | |
|---|---|---|---|
| 2013/0021485 A1* | 1/2013 | Hsu | G02B 27/64 |
| | | | 348/208.99 |
| 2017/0003357 A1 | 1/2017 | Tondra et al. | |
| 2017/0272636 A1 | 9/2017 | Wang et al. | |
| 2018/0205857 A1 | 7/2018 | Chan et al. | |
| 2019/0148429 A1 | 5/2019 | Wang et al. | |
| 2019/0258141 A1* | 8/2019 | Park | H04N 23/45 |
| 2020/0004012 A1 | 1/2020 | Li et al. | |
| 2021/0074750 A1 | 3/2021 | Gu et al. | |
| 2021/0281722 A1 | 9/2021 | Jeong et al. | |
| 2021/0314468 A1* | 10/2021 | Liang | H04N 23/52 |

FOREIGN PATENT DOCUMENTS

| | | |
|---|---|---|
| JP | 2015-529851 | 10/2015 |
| JP | 2017-512353 | 5/2017 |
| KR | 10-2006-0107257 | 10/2006 |
| KR | 10-0675215 | 1/2007 |
| KR | 10-2007-0054304 | 5/2007 |
| KR | 10-2010-0013908 | 2/2010 |
| KR | 10-2010-0083924 | 7/2010 |
| KR | 10-1022865 | 3/2011 |
| KR | 10-2016-0009358 | 1/2016 |
| KR | 10-2017-0117686 | 10/2017 |
| KR | 10-2018-0092251 | 8/2018 |
| KR | 10-2018-0092726 | 8/2018 |
| KR | 10-2019-0129799 | 11/2019 |
| KR | 10-2020-0110972 | 9/2020 |
| KR | 10-2021-0031068 | 3/2021 |

OTHER PUBLICATIONS

Extended Search Report dated Oct. 24, 2024 in European Patent Application No. 22898796.2.

* cited by examiner

CAMERA MODULE AND ELECTRONIC DEVICE INCLUDING THE SAME

CROSS-REFERENCE TO RELATED APPLICATIONS

This application is a continuation of International Application No. PCT/KR2022/013790 designating the United States, filed on Sep. 15, 2022, in the Korean Intellectual Property Receiving Office and claiming priority to Korean Patent Application No. 10-2021-0164917, filed on Nov. 25, 2021, in the Korean Intellectual Property Office, and to Korean Patent Application No. 10-2022-0008968, filed on Jan. 21, 2022, in the Korean Intellectual Property Office, the disclosures of all of which are incorporated by reference herein in their entireties.

BACKGROUND

Field

The disclosure relates to an electronic device, for example, to a camera module and/or an electronic device including the same.

Description of Related Art

Electronic devices may refer to device configured to perform specific functions according to installed programs, such as home appliances, electronic wallets, portable multimedia players, mobile communication terminals, tablet PCs, video/audio devices, desktop/laptop computers, and vehicle navigation systems. For example, electronic devices may output stored information as sounds or images. In line with the high degree of integration of electronic devices and the widespread use of super-fast large-capacity wireless communication, it has recently become possible to equip a single electronic device (for example, mobile communication terminal) with various functions. For example, not only a communication function, but also an entertainment function (for example, gaming), a multimedia function (for example, music/video playback), communication and security functions for mobile banking and the like, a scheduling function, and an electronic wallet function may be integrated into a single electronic device.

Development of digital camera manufacturing technologies has commercialized electronic devices equipped with small and lightweight camera modules. Electronic devices (for example, mobile communication terminals) commonly carried all the time are equipped with camera modules such that users can conveniently use various functions including not only still or moving image capture, but also video conferencing and augmented reality.

There has recently been widespread use of electronic devices including multiple cameras. An electronic device may include, for example, a camera module including a wide-angle camera and a telephoto camera. The electronic device may use the wide-angle camera to photograph a wide range of scenes on the periphery of the electronic device, thereby acquiring wide-angle images, or may use the telephoto camera to photograph scenes corresponding to locations relatively far from the electronic device, thereby acquiring telephoto images. As such, compact electronic devices (for example, smartphones) including multiple camera modules or lens assemblies have gradually replaced compact cameras, and are expected to replace high-performance cameras (for example, single-lens reflex cameras) in the future.

The above-described information may be provided as a background art for helping understand the disclosure. No claim or determination is raised regarding whether any of the above description is applicable as a prior art in connection with the disclosure.

In connection with mounting multiple camera modules, it may be difficult to secure a space in which the camera modules can be disposed, in the case of a compact electronic device (for example, smartphone). For example, a limited number of camera modules may be mounted on electronic devices which tend to become compact, lightweight, and/or thin in view of portability, and there may be restrictions on securing spaces or ranges in which lens(es) can move, thereby making it difficult to implement continuous zoom functions.

A folded camera may be useful in expanding the range of adjustment of the focal length. For example, a folded camera may have a reflective member (for example, prism or mirror) disposed such that, regardless of the direction of incident external light, the direction or arrangement of lenses may be freely designed. Such an improvement in the degree of freedom regarding design of the arrangement direction of lenses in a folded camera may implement a compact telephoto camera, which may be combined with a wide-angle camera and mounted in an electronic device.

In a typical manner in which a user holds an electronic device, or according to a typical configuration of an electronic device, external light may enter the electronic device substantially parallel to the thickness direction of the electronic device when photographing a subject. When a folded camera is disposed in such a typical electronic device or typical holding manner, the direction in which external light enters the electronic device may differ from the direction in which light enters an image sensor. For example, the width or length of the image sensor or image-focusing surface may affect the thickness of the electronic device, and there may thus be difficulty in disposing a folded camera in a compact or flat electronic device (for example, smartphone).

SUMMARY

Embodiments of the disclosure provide a compact camera module and/or an electronic device including the same.

Embodiments of the disclosure may provide a camera module having a folded camera structure such that the same contributes to improvement of telephoto performance, and can be easily mounted in a compact electronic device.

Embodiments of the disclosure may provide an electronic device which is compact, and which includes multiple camera modules, thereby having an improved optical performance.

Additional aspects according to various embodiments will be presented in the following detailed description.

According to various example embodiments of the disclosure, a camera module and/or an electronic device including the same may include: a sensor substrate, an image sensor disposed on one surface of the sensor substrate, a sensor enclosure disposed on the sensor substrate surrounding at least a part of the image sensor, and an optical element comprising a light filter disposed in the sensor enclosure facing the image sensor, wherein the image sensor is configured to detect light incident through the optical element, wherein the sensor enclosure is attached to an edge of one surface of the image sensor at least partially facing the optical element.

According to various example embodiments of the disclosure, an electronic device may include: a housing including a first surface facing a first direction and a second surface facing a second direction opposite to the first direction, and at least one camera module comprising a camera configured to detect light incident through one of the first surface or the second surface, wherein the at least one camera module includes: a sensor substrate, an image sensor disposed on one surface of the sensor substrate, a sensor enclosure disposed on the sensor substrate surrounding at least a part of the image sensor, an infrared blocking filter disposed in the sensor enclosure facing the image sensor, a reflective member comprising a reflective surface configured to receive external light incident through one of the first surface or the second surface from the direction of a first optical-axis and refract or reflect the external light in the direction of a second optical-axis intersecting with the first optical-axis, and at least one lens disposed between the reflective member and the image sensor along the direction of the second optical-axis and configured to guide or focus light refracted or reflected by the reflective member to the image sensor, wherein the image sensor is configured to detect light incident through the infrared blocking filter, and at least a part of the sensor enclosure is attached to an edge of one surface of the image sensor, which faces the infrared blocking filter.

A camera module and/or an electronic device according to various example embodiments of the disclosure may use a sensor enclosure to protect an image sensor from external environments, and the same may be at least partially attached to the surface of the image sensor, thereby facilitating compactness. For example, a camera module according to various example embodiments of the disclosure may be easily disposed in a compact or flat electronic device, and may be useful for a structure in which an electronic device includes multiple camera modules. In an example embodiment, when a camera module according to various example embodiments of the disclosure has a folded structure including a reflective member, the same may be easily disposed in a compact or flat electronic device so as to improve the telephoto performance of the electronic device. Various other advantageous effects identified explicitly or implicitly through the disclosure may be provided.

BRIEF DESCRIPTION OF THE DRAWINGS

The above and other aspects, features, and/or advantages of certain embodiments of the present disclosure will be more apparent m from the following detailed description, taken in conjunction with the accompanying drawings, in which.

Throughout the accompanying drawings, similar reference numbers may be assigned to similar components, configurations, and/or structures.

DETAILED DESCRIPTION

The following description with reference to the accompanying drawings may be provided to assist in a comprehensive understanding for variously implementing the disclosure. The various example embodiments disclosed in the following descriptions include various specific details for helping understanding, but may be regarded as one of various embodiments. Accordingly, it will be apparent to a person skilled in the art that various changes and modifications of the various implementations disclosed in the disclosure may be made without departing from the technical idea and scope of the disclosure. In addition, descriptions of well-known functions and configurations may be omitted for clarity and conciseness.

The terms and words used in the following descriptions and claims may not be limited to the bibliographical meanings, and may be used to clearly and consistently describe the various embodiments of the disclosure. Accordingly, it should be apparent to a person skilled in the art that the following descriptions for various implements of the disclosure are provided for an explanation purpose only and not for the purpose of limitation.

It should be understood that the singular forms "a", "an", and "the" include plural referents unless the context clearly dictates otherwise. Therefore, for example, it may refer, for example, to the term "the surface of an element" including one or more of the surfaces of the element.

Figure 1:
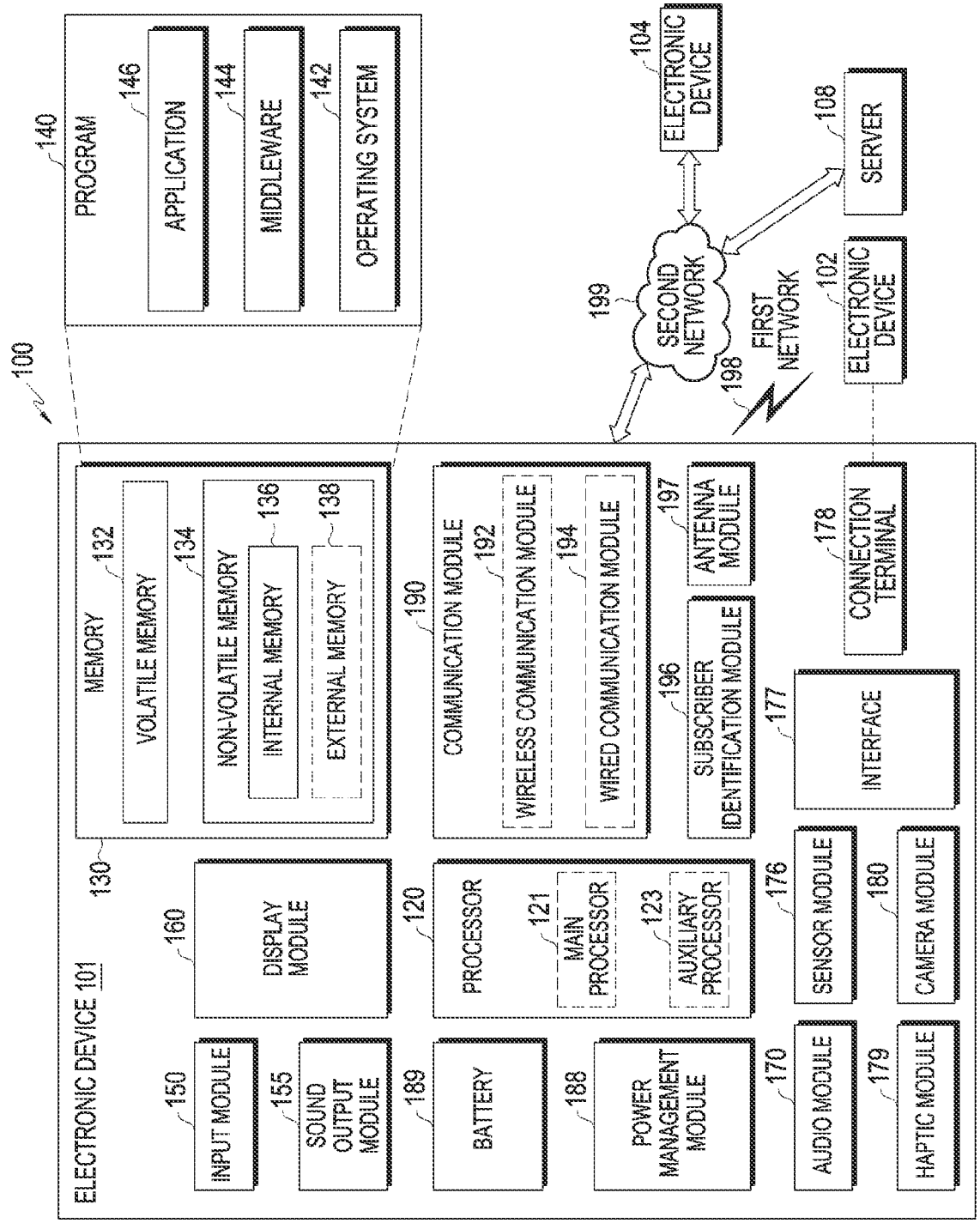
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one 1 or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more electronic devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed descriptions, a longitudinal direction, a width direction, and/or a thickness direction of an electronic device may be mentioned, the longitudinal direction may be defined as the "Y-axis direction", the width direction may be defined as the "X-axis direction", and/or the thickness direction may be defined as the "Z-axis direction". In various embodiments, in connection with the direction in which an element is oriented, in addition to the orthogonal coordinate system illustrated in the drawings, "negative/positive (−/+)" may be mentioned together therewith. For example, the front surface of an electronic device or a housing may be defined as "a surface facing the +Z direction", and the rear surface thereof may be defined as "a surface facing the −Z direction". In various embodiments, a side surface of an electronic device or a housing may include a region facing the +X direction, a region facing the +Y direction, a region facing the −X direction, and/or a region facing the −Y direction. In an embodiment, "the X-axis direction" may have a meaning including both "the −X direction" and "the +X direction". The foregoing is based on the orthogonal coordinate system illustrated in the drawings for the sake of brevity of descriptions, and it should be noted that the directions or descriptions of elements do not limit the various embodiments disclosed in the disclosure.

Figure 2:
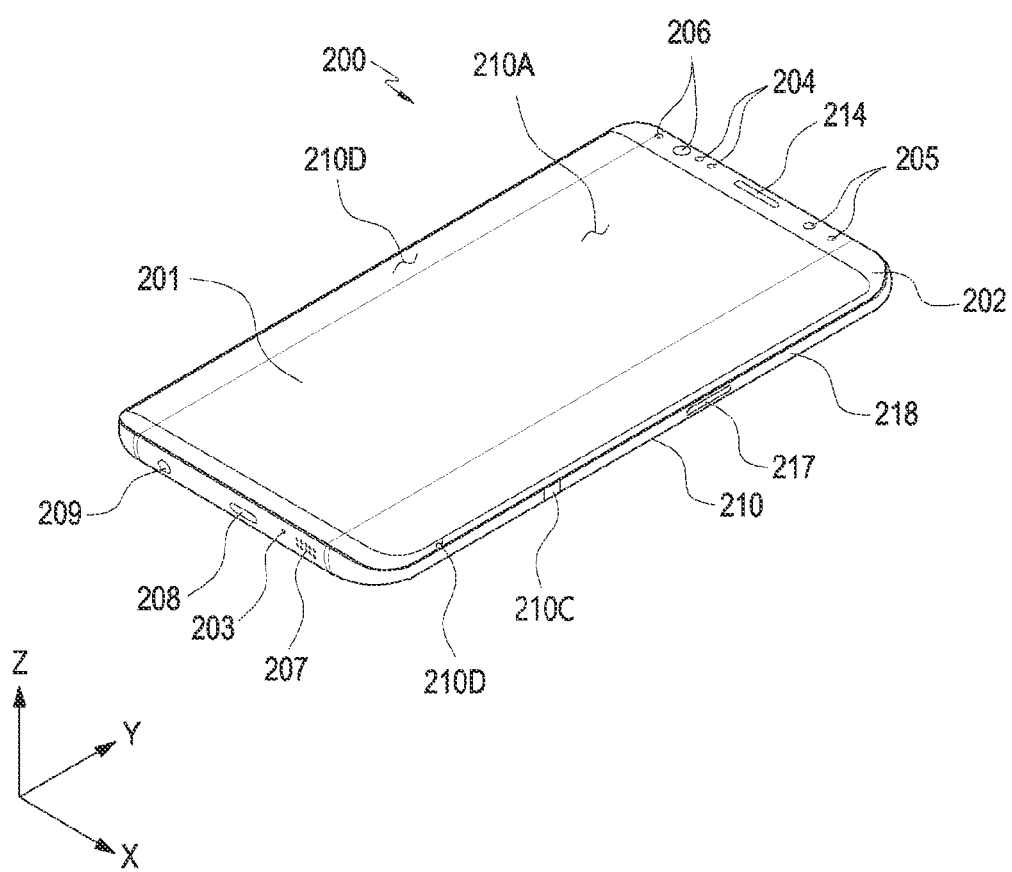
FIG. 2 is a front perspective view of an electronic device according to various embodiments.
Figure 3:
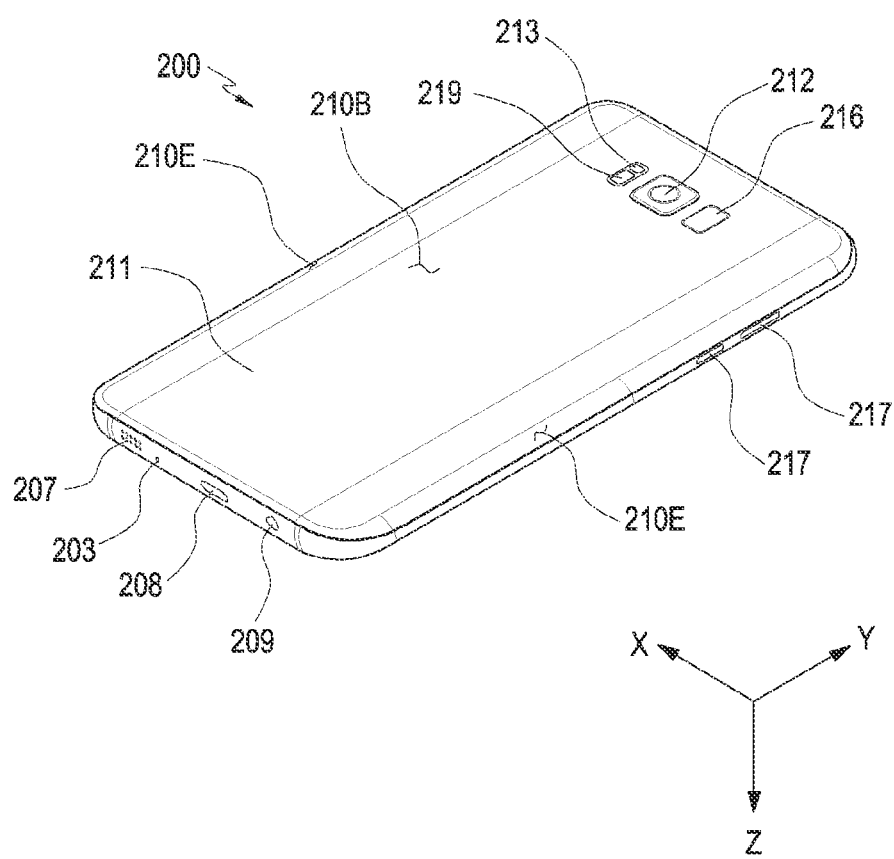
FIG. 3 is a rear perspective view of the electronic device illustrated in FIG. 2 according to various embodiments.

FIG. 2 is a front perspective view of an electronic 200 according to various embodiments. FIG. 3 is a rear perspective view of the electronic 200 illustrated in FIG. 2 according to various embodiments.

Referring to FIG. 2 and FIG. 3, an electronic device 200 according to an embodiment may include a first surface (or a front surface) 210A, a second surface (or a rear surface) 210B, and a housing 210 including a side surface 210C configured to surround a space between the first surface 210A and the second surface 210B. In an embodiment (not shown), a housing may be referred to as a structure configured to form a part of the first surface 210A, the second surface 210B, and the side surface 210C of FIG. 2. According to an embodiment, the first surface 210A may be formed by a front plate 202 (e.g., a glass plate including various coating layers or a polymer plate) of which at least a portion is substantially transparent. The second surface 210B may be formed by a substantially opaque rear plate 211. For example, the rear plate 211 may be formed of coated or colored glass, ceramic, polymer, metal (e.g., aluminum, stainless steel (STS), or magnesium), or a combination of at least two of the above materials. The side surface 210C may be coupled to the front plate 202 and the rear plate 211, and may be formed by a side-surface structure (or "a side-surface bezel structure") 218 including metal and/or polymer. In various embodiments, the rear plate 211 and the side-surface structure 218 may be integrally formed, and may include the same material (e.g., a metal material such as aluminum).

In the illustrated embodiment, the front plate 202 may include two first regions 210D which are provided in opposite long edge ends of the front plate 202 and configured to be bent from the first surface 210A toward the rear plate 211 and to extend seamlessly. In the illustrated embodiment (see FIG. 3), the rear plate 211 may include two second regions 210E which are provided in opposite long edge ends thereof and configured to be bent from the second surface 210B toward the front plate 202 and to extend seamlessly. In various embodiments, the front plate 202 (or the rear plate 211) may include only one of the first regions 210D (or the second regions 210E). In an embodiment, a part of the first regions 210D or the second regions 210E may not be included therein. In the embodiments, when seen from the side surface of the electronic device 200, the side-surface structure 218 may have a first thickness (or width) in the side-surface side not including the first regions 210D or the second regions 210E, and may have a second thickness thinner than the first thickness, in the side-surface side including the first regions 210D or the second regions 210E.

According to an embodiment, the electronic device 200 may include at least one of a display 201, audio modules 203, 207, and 214, sensor modules 204, 216 and 219, camera modules 205, 212, and 213, a key input device 217, a light-emitting element 206, and connector holes 208 and 209. In various embodiments, at least one of elements (e.g., the key input device 217 or the light-emitting element 206) may be omitted from the electronic device 200, or other elements may be additionally included therein.

For example, the display 201 may be visible through a substantial portion of the front plate 202. In various embodiments, at least a part of the display 201 may be visible through the front plate 202 configured to form the first surface 210A and the first regions 210D of the side surface 210C. In various embodiments, the corners of the display 201 may be formed to have a shape substantially the same as the outer shape of those of the front plate 202, which is adjacent thereto. In an embodiment (not shown), in order to expand a region which allows the display 201 to be visually exposed, the gap between the outer perimeter of the display 201 and the outer perimeter of the front plate 202 may be formed to be substantially the same.

In an embodiment (not shown), a recess or an opening may be formed in a part of a screen display region of the display 201, and at least one of the audio module 214, the sensor module 204, the camera module 205, and the light-emitting element 206, which are aligned with the recess or the opening, may be included therein. In an embodiment (not shown), at least one of the audio module 214, the sensor module 204, the camera module 205, a fingerprint sensor 216, and the light-emitting element 206 may be included on the rear surface of the screen display region of the display 201. In an embodiment (not shown), the display 201 may be coupled to or disposed adjacent to a touch detection circuit, a pressure sensor capable of measuring the intensity (pressure) of touch, and/or a digitizer for detecting a stylus pen of a magnetic field type. In various embodiments, at least a part of the sensor module 204 or 219 and/or at least a part of a key input device 217 may be positioned in the first regions 210D and/or the second regions 210E.

The audio modules 203, 207, and 214 may include a microphone hole 203 and speaker holes 207 and 214. A microphone for acquiring external sound may be disposed inside the microphone hole 203, and in various embodiments, multiple microphones may be arranged to detect the direction of sound. The speaker holes 207 and 214 may include an external speaker hole 214 and a receiver hole 207 for a call. In various embodiments, the speaker holes 207 and 214 and the microphone hole 203 may be implemented as one hole, or only a speaker may be included without the speaker holes 207 and 214 (e.g., a piezo speaker).

The sensor modules 204, 216, and 219 may be configured to generate an electrical signal or a data value corresponding to an internal operation state of the electronic device 200 or an external environmental state. For example, the sensor modules 204, 216, and 219 may include a first sensor module 204 (e.g., a proximity sensor) disposed on the first surface 210A of the housing 210 and/or a second sensor module (not shown) (e.g., a fingerprint sensor), and/or a third sensor module 219 (e.g., an HRM sensor) disposed on the second surface 210B of the housing 210 and/or a fourth sensor module 216 (e.g., a fingerprint sensor). The fingerprint sensor may be disposed on not only the first surface 210A (e.g., the display 201) of the housing 210 but also the second surface 210B. The electronic device 200 may further include at least one of a sensor module 176 of FIG. 1, for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, and a second camera device 212 and/or a flash 213 arranged on the second surface 210B. The camera devices 205 and 212 each may include one lens or multiple lenses, an image sensor, and/or an image signal processor. For example, the flash 213 may include a light-emitting diode or a xenon lamp. In various embodiments, two or more lenses (an infrared camera, a wide-angle lens, and a telephoto lens) and image sensors may be arranged on one surface of the electronic device 200.

The key input device 217 may be disposed on the side surface 210C of the housing 210. In an embodiment, the electronic device 200 may not include a part or the whole part among key input devices 217 mentioned above, and the key input device 217 not included therein may be implemented as a different type such as a soft key, on the display 201. In various embodiments, the key input device 217 may include the sensor module 216 disposed on the second surface 210B of the housing 210.

For example, the light-emitting element 206 may be disposed on the first surface 210A of the housing 210. For example, the light-emitting element 206 may be configured to provide state information of the electronic device 200 in the form of light. In an embodiment, for example, the light-emitting element 206 may provide a light source interlocked with an operation of the camera module 205. For example, the light-emitting element 206 may include an LED, an IR LED, and a xenon lamp.

The connector holes 208 and 209 may include a first connector hole 208 capable of accommodating a connector (for example, a USB connector) for transmitting and receiving power and/or data to and from an external electronic device, and/or a second connector hole 209 (for example, an earphone jack) capable of accommodating a connector for transmitting and receiving audio signals to and from an external electronic device.

Figure 4:
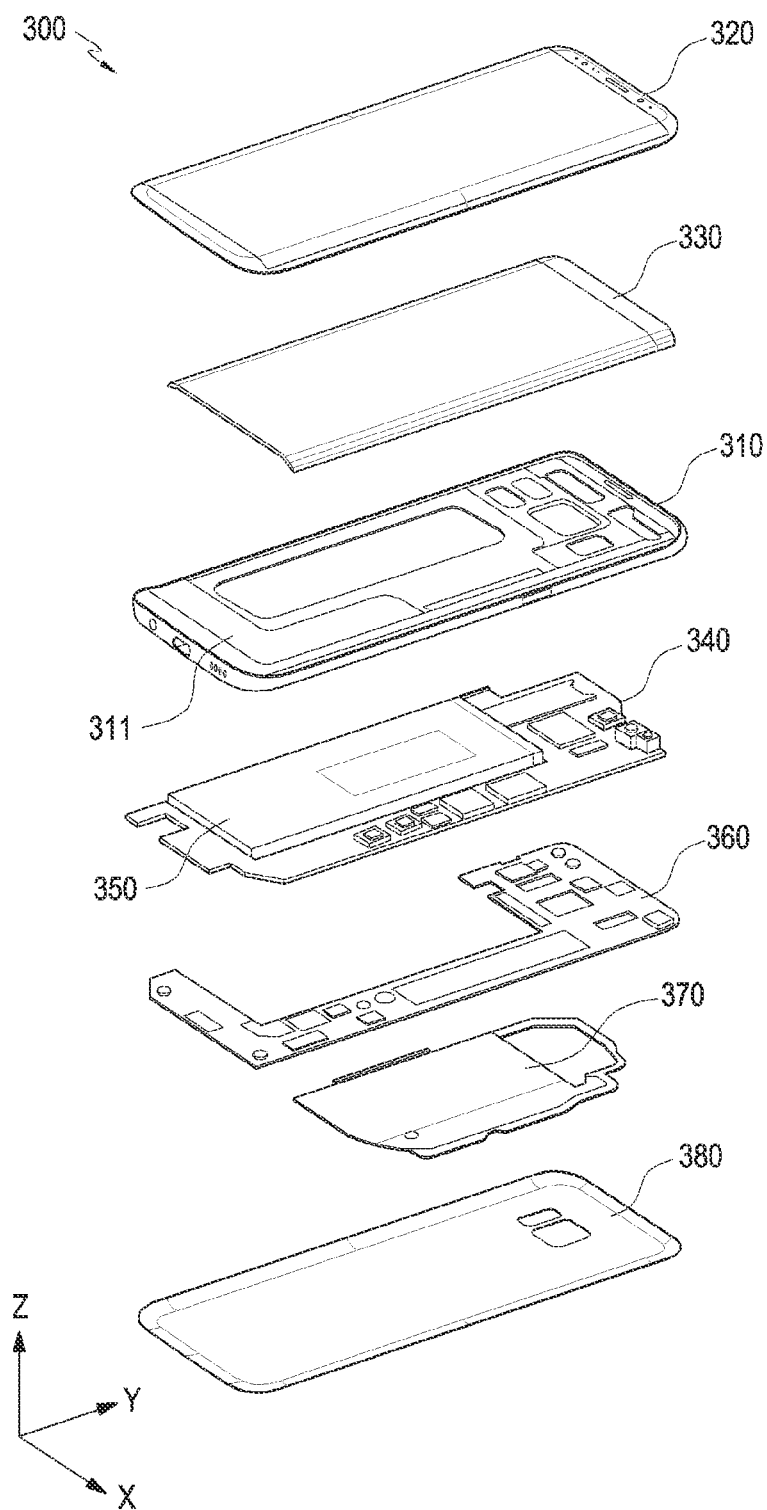
FIG. 4 is an exploded perspective view of the electronic device illustrated in FIG. 2 according to various embodiments.

FIG. 4 is an exploded perspective view of the electronic device 200 illustrated in FIG. 2 according to various embodiments.

Referring to FIG. 4, an electronic device 300 (e.g., the electronic device 101 or 200 of FIG. 1 to FIG. 3) may include a side-surface structure 310, a first support member 311 (e.g., a bracket), a front plate 320 (e.g., the front plate 202 of FIG. 2), a display 330 (e.g., the display 201 of FIG. 2), a printed circuit board 340 (e.g., a printed circuit board (PCB), a printed board assembly (PBA), a flexible PCB (FPCB), or rigid-flexible PCB (RFPCB)), a battery 350, a second support member 360 (e.g., a rear case), an antenna 370, and a rear plate 380 (e.g., the rear plate 211 of FIG. 3). In various embodiments, at least one of elements (e.g., the first support member 311 or the second support member 360) may be omitted from the electronic device 300, or other elements may be additionally included therein. At least one of elements of the electronic device 300 may be the same as or similar to at least one of elements of the electronic device 200 of FIG. 2 or FIG. 3, and thus overlapping descriptions will be omitted hereinafter.

The first support member 311 may be disposed inside the electronic device 300 to be connected to the side-surface structure 310 or to be integrally formed with the side-surface structure 310. For example, the first support member 311 may be formed of a metal material and/or a non-metal (e.g., polymer) material. The support member 311 may have one surface to which the display 330 is coupled, and the other surface to which the printed circuit board 340 is coupled. The printed circuit board 340 may have a processor, a memory, and/or an interface, which are mounted thereon. For example, the processor may include one or more of a central processing unit, an application processor, a graphic processing unit, an image signal processor, a sensor hub processor, or a communication processor.

For example, the memory may include a volatile memory or a non-volatile memory.

For example, the interface may include a high definition multimedia interface (HDMI), a universal serial bus (USB) interface, an SD card interface, and/or an audio interface. For example, the interface may be configured to electrically or physically connect the electronic device 300 to an external electronic device, and may include a USB connector, an SD card/MMC connector, or an audio connector.

The battery 350 may be a device configured to supply power to at least one element of the electronic device 300, and for example, may include a non-rechargeable primary cell, a rechargeable secondary cell, or a fuel cell. For example, at least a part of the battery 350 may be disposed on substantially the same plane as the printed circuit board 340. The battery 350 may be integrally disposed inside the electronic device 300, or may be disposed to be detachable/attachable from/to the electronic device 300.

The antenna 370 may be disposed between the rear plate 380 and the battery 350. For example, the antenna 370 may include a near field communication (NFC) antenna, a wireless charging antenna, and/or a magnetic secure transmission (MST) antenna. For example, the antenna 370 may be configured to perform a short-range communication with an external device, or may be configured to transmit/receive a power required for charging in a wireless. In an embodiment, an antenna structure may be formed by a part of the side-surface structure 310 and/or the first support member 311, or a combination thereof.

In the following detailed descriptions, the electronic device 101, 102, 101, 200, or 300 of the various embodiments may be referred to, and it should be noted that, with respect to configurations which can be easily understood through the various embodiments, reference numerals in the drawings may be assigned the same or omitted, and detailed descriptions thereof may also be omitted.

Figure 5:
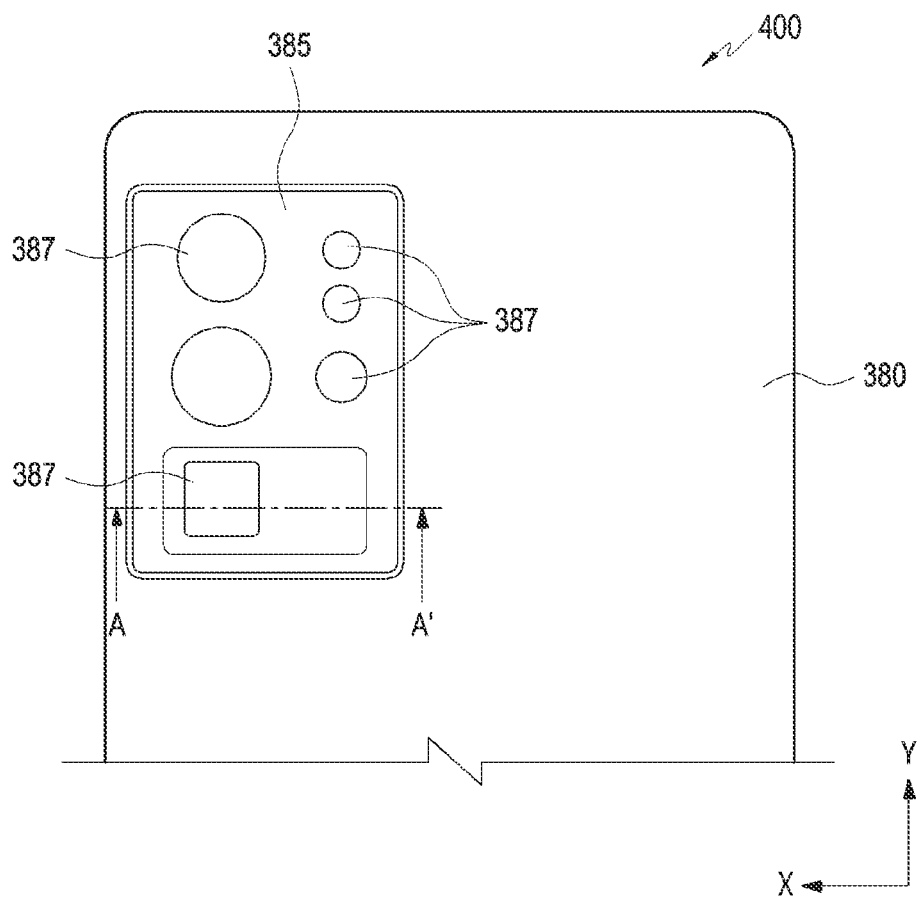
FIG. 5 is a diagram illustrating the rear surface of an electronic device according to various embodiments.
Figure 6:
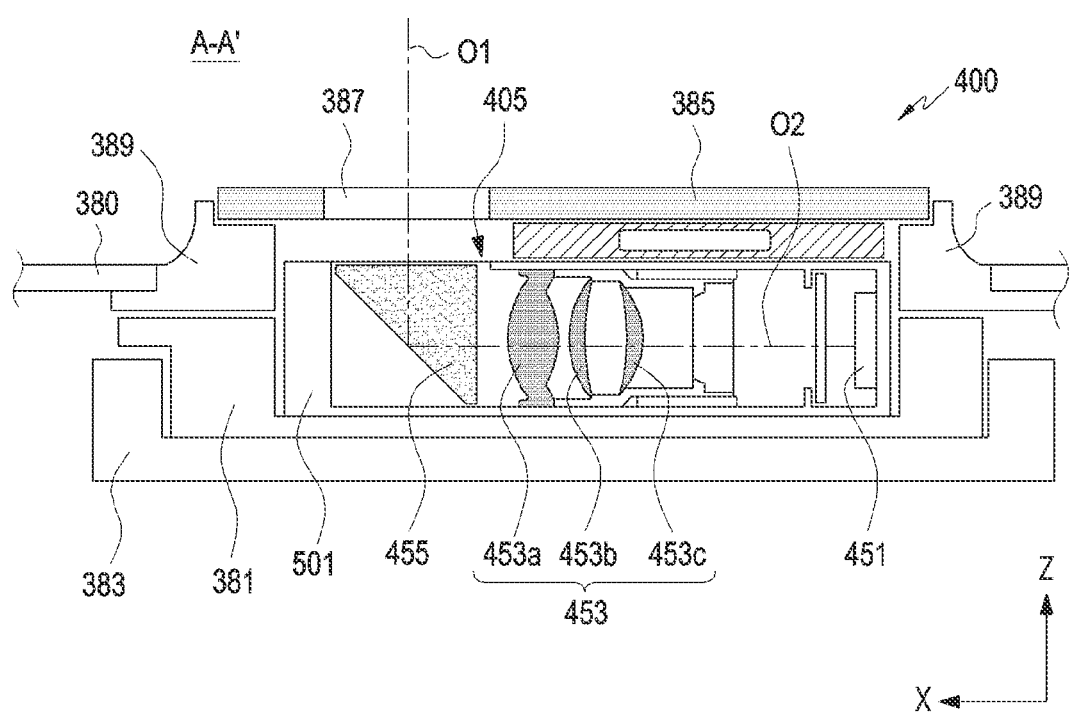
FIG. 6 is a partial cross-sectional view of an electronic device taken along the A-A' of FIG. 5 according to various embodiments.
Figure 7:
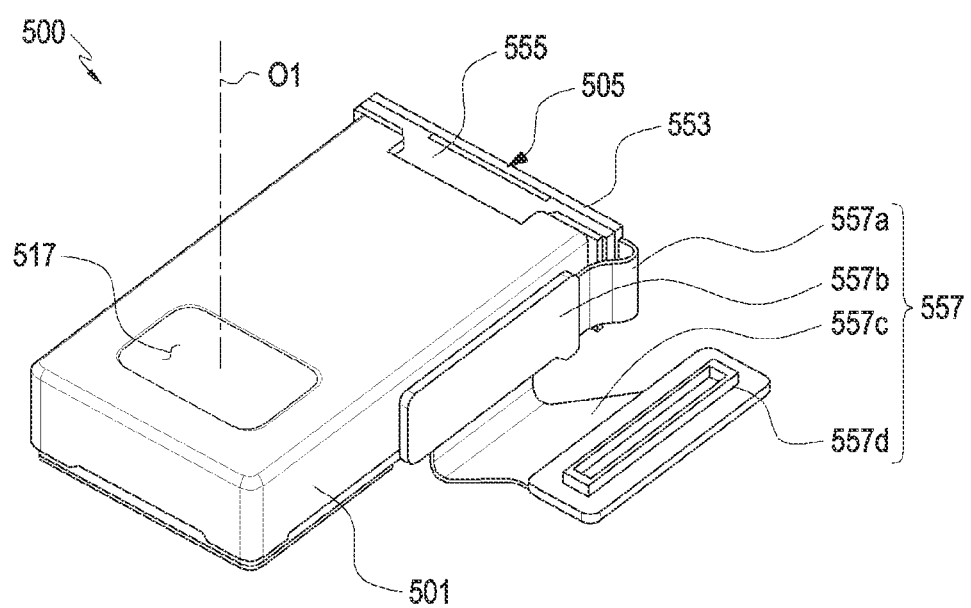
FIG. 7 is a perspective view of a camera module according to various embodiments.

FIG. 5 is a diagram illustrating the rear surface of an electronic device 400 (e.g., the electronic device 101, 102, 104, 200, or 300 of FIG. 1 to FIG. 4) according to various embodiments disclosed in the disclosure. FIG. 6 is a partial cross-sectional view of the electronic device 400 taken along the A-A' of FIG. 5 according to various embodiments. FIG. 7 is a perspective view of a camera module 500 (e.g., the camera module 405 of FIG. 6) according to various embodiments.

Referring to FIG. 5 and FIG. 7, an electronic device 400 according to various embodiments disclosed in the disclosure may include a camera window 385 disposed on one surface (e.g., the second surface 210B of FIG. 3). In various embodiments, the camera window 385 may be a part of the rear plate 380. In an embodiment, the camera window 385 may be coupled to the rear plate 380 through a decoration member 389, and when seen from the outside, the decoration member 389 may be exposed in a form of surrounding the perimeter of the camera window 385. According to an embodiment, the camera window 385 may include multiple transparent regions 387, and the camera module 500 may be disposed inside the camera window 385 to receive external light through at least one of the transparent regions 387. In an embodiment, the electronic device 400 may include at least one light source (e.g., an infrared light source) disposed to correspond to the other one of the transparent regions 387 so as to emit light to the outside. For example, the camera modules 405 and 500 or the light source may be arranged to receive external light or emit light to the outside of the electronic device 400, through one of the transparent regions 387.

According to various embodiments, the electronic device 400 may include, as the camera modules 405 and 500 or a light-receiving element, at least one of a wide-angle camera, an ultra-wide-angle camera, a close-up camera, a telephoto camera, or an infrared photodiode, and may include a flash (e.g., the flash 213 of FIG. 3) or an infrared laser diode as a light source or a light-emitting element. In various embodiments, the electronic device 400 may be configured to, using an infrared laser diode and an infrared photodiode, emit an infrared laser toward a subject and receive an infrared laser reflected by the subject, and thus to detect the distance or depth to the subject. In an embodiment, the electronic device 400 may be configured to photograph an image of a subject by one or a combination of two or more of the camera modules, and to provide illumination toward the subject using a flash as necessary.

According to various embodiments, a wide-angle camera, an ultra-wide angle camera, or a close-up camera of the camera modules may be configured to have a smaller length in the direction of the optical axis of a lens(es) when compared to a telephoto camera (e.g., the camera modules 405 and 500). For example, a telephoto camera (e.g., the camera module 405 and 500), which has a relatively large focal length adjustment range, may have a lens(es) 453a, 453b, or 453c having a greater forward/backward movement range. In an embodiment, although the lens(es) of a wide-angle camera, an ultra-wide-angle camera, or a close-up camera is disposed along the direction of the thickness (e.g., the thickness measured in the Z-axis direction of FIG. 4 or FIG. 6) of the electronic device 400, the influence of the thickness thereof on the thickness of the electronic device 400 may be substantially small. For example, a wide-angle camera, an ultra-wide-angle camera, or a close-up camera may be arranged in the electronic device 400 such that the direction, in which light is incident from the outside to the electronic device 400, and the direction of the optical-axis of the lens(es) are substantially the same.

According to various embodiments, when compared to a wide-angle camera, an ultra-wide-angle camera, or a close-up camera, the camera modules 405 and 500 (e.g., a telephoto camera) may be configured to have a small field of view, but may be useful for photographing a subject at a greater distance, and may include more the lens(es) 453a, 453b, and 453c or may be configured such that the movement distance of the lens(es) 453a, 453b, or 453c is greater in the adjustment of the focal length thereof. For example, when the lens(es) 453a, 453b, or 453c of the camera module 405 and 500 is disposed in the thickness direction (e.g., the Z-axis direction) of the electronic device 400, the thickness of the electronic device 400 may be increased, or the camera modules 405 and 500 may be configured to have a substantial portion protruding to the outside of the electronic device 400.

According to various embodiments, the camera modules 405 and 500 may include a folded camera including an optical member (e.g., the reflective member 455) such as a prism or mirror, and may be configured to have a free design or arrangement in which the lenses 453a, 453b, and 453c are arranged in the direction (e.g., the direction of the second optical-axis O2 of FIG. 6), regardless of the direction (e.g., the direction of the first optical-axis O1 of FIG. 6) in which external light is incident. For example, a reflective member 455 may be configured to refract or reflect light incident from the outside such that the direction, in which the light travels, is changed and then the light is guided to the lenses 453a, 453b, and 453c. The lenses 453a, 453b, and 453c may be configured to guide or focus, to the image sensor 451, light refracted or reflected between the reflective member 455 and the image sensor 451 by the reflective member 455 (e.g., reflective surface).

According to various embodiments, the direction of the first optical-axis O1 may be substantially parallel to the thickness direction of the electronic device 400, and the direction of the second optical-axis O2 may be a direction in which light refracted or reflected by the reflective member 455 travels, and may be a direction intersecting with the direction of the first optical-axis O1. In various embodiments, the direction of the second optical-axis O2 may be substantially perpendicular to the direction of the first optical-axis O1, and may be substantially parallel to the width direction (e.g., the X-axis direction of FIG. 4) or the longitudinal direction (e.g., the Y-axis direction of FIG. 4) of the electronic device 400 or a housing (e.g., the housing 210 of FIG. 2). In an embodiment, the second optical-axis O2 may be substantially parallel to the XY plane while intersecting with the width direction or the longitudinal direction of the housing.

The camera module 405 illustrated in FIG. 6 may be an example of a folded camera or a telephoto camera, and the lenses 453a, 453b, and 453c may be arranged along the width direction (e.g., the direction parallel to the X-axis) of the electronic device 400 or arranged to be moveable upward or backward along the width direction. According to an embodiment, the camera module 405 may include the reflective member 455 configured to receive and then refract or reflect external light, a lens system 453 (a lens assembly) configured such that light refracted or reflected by the reflective member 455 is incident to an image sensor, and/or the image sensor 451 aligned on an optical-axis (e.g., the second optical-axis O2) of the lens system 453. For example, the image sensor 451 may be configured to receive external light through the reflective member 455 and the lens system 453. In various embodiments, external light may be incident to the reflective member 455 along the direction of the first optical-axis O1, may be reflected or refracted by the reflective member 455, and then may be incident to the image sensor 451 through the lens system 453 while traveling along the direction of the second optical-axis O2.

According to various embodiments, for example, the reflective member 455 may include a prism or a mirror, and may be configured to reflect or refract light incident along the direction of the first optical-axis O1 in another direction (e.g., the direction of the second optical-axis O2). In the embodiment, although the configuration, in which the direction of the first optical-axis O1 and the direction of the second optical-axis O2 are substantially perpendicular, is illustrated, various embodiments of the disclosure may not be limited thereto, and the angle, at which the direction of the first optical-axis O1 and the direction of the second optical-axis O intersect with each other, may be various according to the structure of the electronic device 400 or a housing (e.g., the housing 210 of FIG. 2). In an embodiment, the lens system 453 may be an assembly including at least one lens 453a, 453b, or 453c, the lenses 453a, 453b, and 453c may be arranged along the direction of the second optical-axis O2. In various embodiments, the direction of the first optical-axis O1 may be substantially parallel to the thickness direction (e.g., the Z-axis direction) of the electronic device 400, and the direction of the second optical-axis O2 may be substantially parallel to the width direction (e.g., the X-axis direction) or the longitudinal direction (e.g., the Y-axis direction) of the electronic device.

According to various embodiments, the electronic device 400 may include a first camera support member 381 or a second camera support member 383. The first camera support member 381 or the second camera support member 383 may be configured to allow such that at least one of the camera modules 405 and 500 and/or another camera module (e.g., a wide-angle camera, an ultra-wide angle camera, or a close-up camera) adjacent to the camera modules 405 and 500 is disposed or fixed on the rear plate 380 or inside the camera window 385. In various embodiments, substantially, the first camera support member 381 or the second camera support member 383 may be a part of a second support member (e.g., the second support member 360 of FIG. 4) or the first support member (e.g., the first support member 311 of FIG. 4).

Referring to FIG. 7, the camera module 500 may include a camera housing 501 and/or a sensor assembly 505. For example, the camera housing 501 may be configured to accommodate the reflective member 455 and/or the lens system 453, and may include an opening 517 to allow external light to be incident therein. For example, the opening 517 may be disposed to correspond to one of the transparent regions 387 of FIG. 5 or FIG. 6 on the first optical-axis O1. In various embodiments, the opening 517 may be configured to allow light to pass therethrough and to separate the inner space of the camera housing 501 from the outer space. In an embodiment, the reflective member 455 may be disposed to face the opening 517 in the camera housing 501. For example, the sensor assembly 505 may include an image sensor (e.g., the image sensor 451 and 551 of FIG. 6 or FIG. 9), a sensor substrate 553, a sensor enclosure 555 (e.g., a sub-housing or a holder), and/or a wiring substrate 557, and may be coupled to the camera housing 501 at a position spaced apart by a designated distance from the opening 517. The sensor assembly 505 will be described in greater detail below with further reference to the embodiments of FIG. 8 or FIG. 9.

Although reference numbers of the drawings and detailed descriptions are omitted, the camera modules 405 and 500 or the electronic device 400 may further include a barrel structure for disposing the lenses 453a, 453b, and 453c at a designated position, or a driving device for focus adjustment, focal length adjustment, and/or an image stabilization operation. In various embodiments, in a plane substantially perpendicular to the direction of the second optical-axis O2, the camera modules 405 and 500 or the electronic device 400 may further include a driving device for moving the image sensor 451, and may be configured to move the image sensor 451 so as to perform an image stabilization operation. In addition, in an embodiment, the image stabilization operation may be implemented by rotating or tilting the reflective member 455 (e.g., a prism). In the image stabilization operation, the reflective member 455 may be rotated or tilted in an angle range of about 1.5 degrees.

According to various embodiments, when combined with a first camera module such as a wide-angle camera, an ultra-wide angle camera, or a close-up camera, a second camera module (e.g., the camera modules 405 and 500 of FIG. 6 or FIG. 7), which is configured to perform a telephoto function, may be configured to function as a tracking or scan camera which tracks a subject in the region of an image photographed by the first camera module or scans a partial region of the image. In an operation of tracking a subject or scanning a part of an image area, the range of angle, in which the reflective member 455 is rotated or tilted, may be larger than that in the image stabilization operation.

Figure 8:
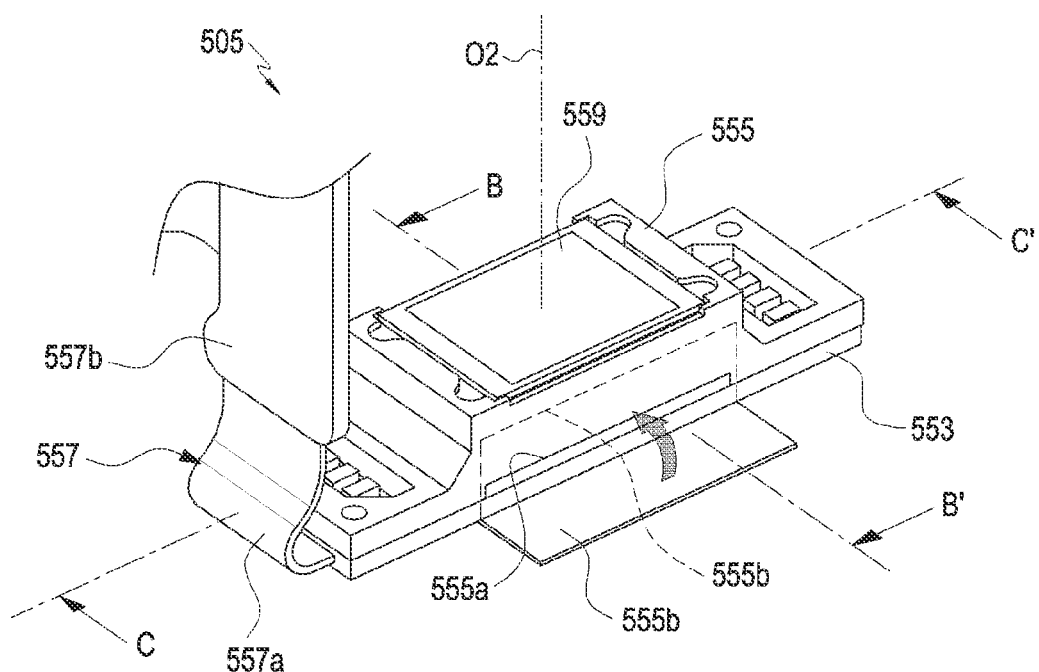
FIG. 8 is a perspective view of a sensor assembly of a camera module according to various embodiments.
Figure 9:
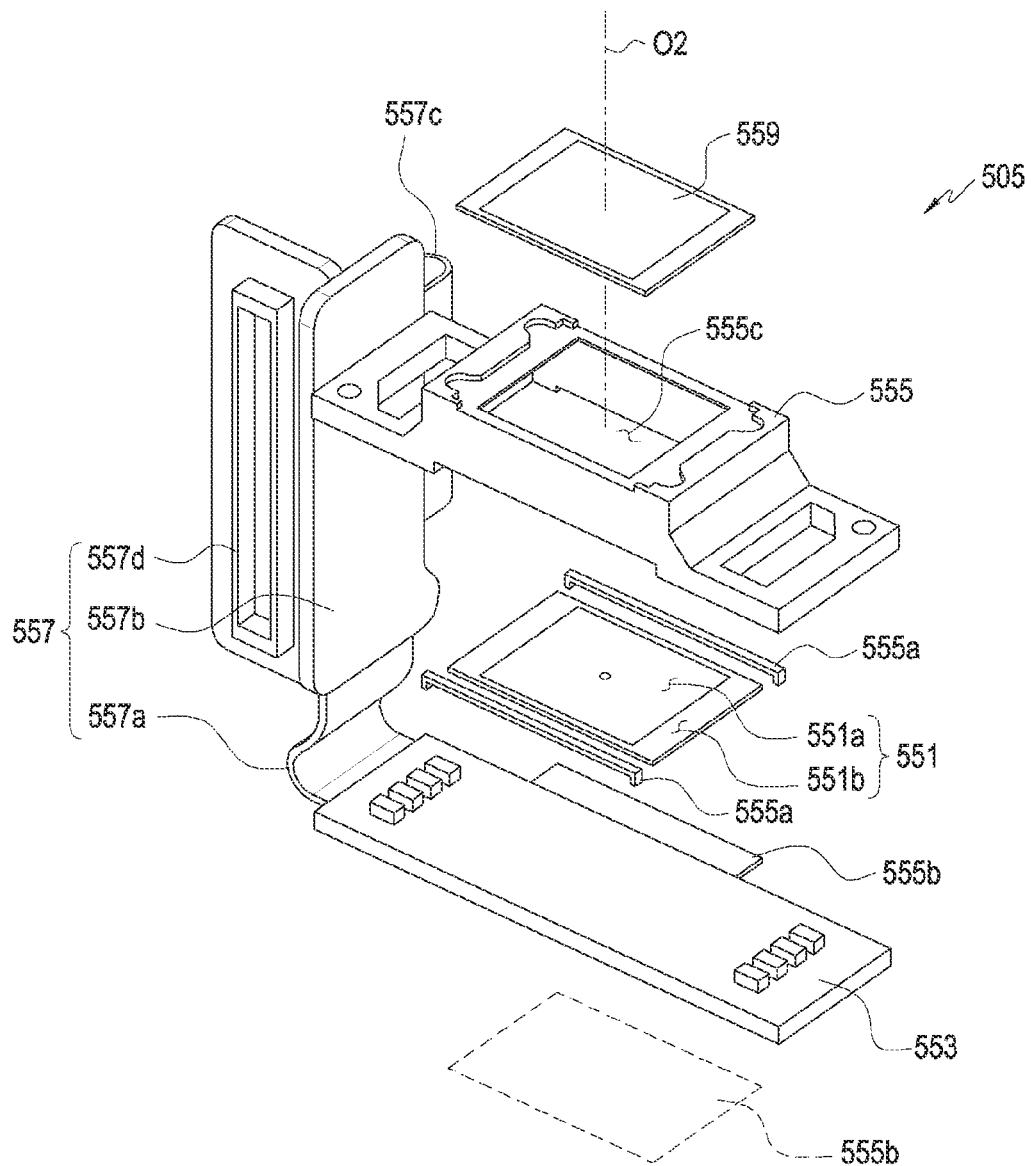
FIG. 9 is an exploded perspective view of a sensor assembly of a camera module according to various embodiments.
Figure 10:
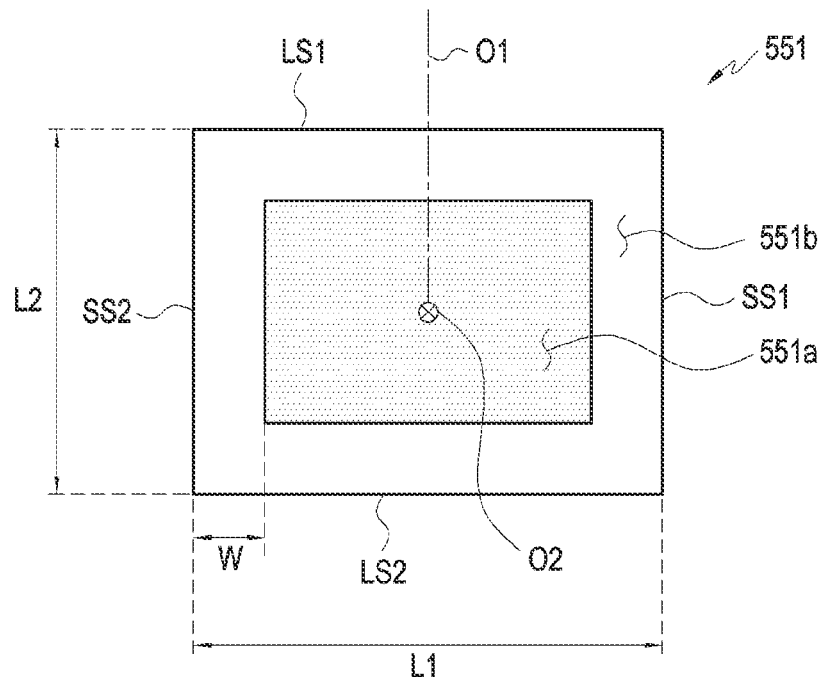
FIG. 10 is a diagram illustrating an image sensor of a camera module according to various embodiments.

FIG. 8 is a perspective view of a sensor assembly 505 of a camera module (e.g., the camera module 500 of FIG. 7) according to various embodiments. FIG. 9 is an exploded perspective view of a sensor assembly 505 of a camera module 500 according to various embodiments. FIG. 10 is a diagram illustrating an image sensor 551 of a camera module 500 according to various embodiments.

Referring further to FIG. 8 to FIG. 10, an image sensor 551 may be disposed on one surface of a sensor substrate 553 and may be electrically connected to the sensor substrate 553 by wire bonding. According to an embodiment, a surface of the image sensor 551, which receives external light, may include an active region 551a and an inactive region 551b disposed in at least a part around the active region 551a. The "active region 551a" may be a region in which sensors (e.g., pixels) for receiving or detecting light are arranged, and may be formed to be spaced apart from the edge of the image sensor 551 by a designated distance (e.g., the width W of the inactive region 551b). In an embodiment, the image sensor 551 (e.g., the active region 551a) may be substantially aligned on the second optical-axis O2. For example, the inactive region 551b may be configured to provide a designated gap between the edge of the image sensor 551 and the active region 551a so as to protect the active region 551a, and in various embodiments, may be utilized as a region in which electrical wiring is disposed. For example, "the region in which electrical wiring is disposed" may be understood as a region in which an electrode pad(s) for wire bonding (not shown) is disposed.

According to various embodiments, the image sensor 551 may have one surface having a generally rectangular shape and may include the active region 551a on the one surface. For example, one surface of the image sensor 551 or one surface on which the active region 551a is disposed, may have an edge including a pair of long sides LS1 and LS2 and a pair of short sides SS1 and SS2, and the long sides LS1 and LS2 and the short sides SS1 and SS2 may be arranged to be substantially perpendicular to each other. According to an embodiment, a first long side LS1 of the pair of long sides LS1 and LS2 may be configured to extend in a first direction (e.g., the horizontal direction of FIG. 10), and may have a first length L1 in the first direction. A first short side SS1 of the pair of short sides SS1 and SS2 may be configured to extend from one end of the first long side LS1 in a second direction (e.g., the vertical direction in FIG. 10) intersecting with the first direction, and may have a second length L2 smaller than the first length L1. A second long side LS2 of the pair of long sides LS1 and LS2 may be configured to extend from one end of the first short side SS1 in the first direction, and may have the first length L1. In an embodiment, the second long side LS2 may be spaced apart from the first long side LS1 by the second length L2, and may be configured to be substantially parallel to the first long side LS1. The second short side SS2 of the pair of short sides SS1 and SS2 may be configured to extend from the other end of the second long side LS2 in the second direction so as to be connected to the other end of the first long side LS1, and may have the second length L2. In an embodiment, the second short side SS2 may be spaced apart from the first short side SS1 by the first length L1, and may be configured to be substantially parallel to the first short side SS1.

According to various embodiments, the first length L1 may be understood as a horizontal length of the image sensor 551, and the second length L2 may be understood as a vertical length of the image sensor 551. As will be described later, a part of the sensor enclosure 555 may be attached to an edge of one surface (e.g., the surface on which the active region 551*a* is disposed) of the image sensor 551. According to an embodiment, a part of the sensor enclosure 555 may be attached to one surface of the image sensor 551 at the edge of the side of the first long side LS1 and/or the edge of the side of the second long side LS2. For example, when seen from the direction of the second optical-axis O2, the sensor assembly may have a generally rectangular shape, and even though the sensor enclosure is disposed, the vertical length of the sensor assembly 505 may be substantially the same as the second length L2. According to an embodiment, when the camera module 500 or the sensor assembly 505 is disposed in the electronic device 400, since the second length L2 is parallel to the thickness direction (e.g., the Z-axis direction of FIG. 2 to FIG. 6) of the electronic device 400, the influence of the size of the camera module 500 or the sensor assembly 505 on the size (e.g., the thickness) of the electronic device 400 may be reduced. For example, since the short sides SS1 and SS2 of the image sensor 551 are arranged to be parallel to the thickness direction of the electronic device 400, the camera module 500 (or the sensor assembly 505) may be easily mounted in the miniaturized or thinned electronic device 400. In various embodiments, it may be understood that the short sides SS1 and SS2 of the image sensor 551 are configured to extend in a direction from the first surface (e.g., the first surface 210A of FIG. 2) toward the second surface (e.g., the second surface 210B of FIG. 3) of a housing. In the arrangement structure, the first long side LS1 and the second long side LS2 may be arranged to intersect with the thickness direction (e.g., the Z-axis direction) or the direction of the first optical-axis O1 of the electronic device 400, and may be sequentially arranged along the thickness direction or the direction of the first optical-axis O1 of the electronic device 400.

According to various embodiments, although the first length L1 and the second length L2 of the image sensor 551 are the same, when the sensor enclosure 555 has been disposed on one surface of the image sensor 551 at the edge corresponding to the first length L1, the sensor assembly 505, which is seen in the direction of the second optical-axis O2, may have a generally rectangular shape. For example, although the image sensor 551 has a substantially square shape, the vertical length of the sensor assembly 505 may be minimized and/or reduce according to an arrangement of the sensor enclosure 555.

According to various embodiments, in a state where the image sensor 551 is disposed on the sensor substrate 553, it may be configured such that an electrical connection (e.g., wire bonding) between the image sensor 551 and the sensor substrate 553 is substantially made at the side of the short side(s) SS1 and SS2 of the image sensor 551. For example, wire bonding may be configured to electrically connect the sensor substrate 553 and the image sensor 551 by crossing the short side(s) SS1 and SS2 of the image sensor 551. In various embodiments, in the width direction (e.g., the X-axis direction of FIG. 2 to FIG. 3) or the longitudinal direction (e.g., the Y-axis direction of FIG. 2 to FIG. 3) of the electronic device 400, the gap (e.g., the width W of the inactive region 551*b*) between the edge and the active region 551*a* of the image sensor 551 may be sufficiently secured.

For example, the image sensor 551 may have a high freedom degree of size design, in the width direction or longitudinal direction than in the thickness direction of the electronic device 400. According to an embodiment, in the structure in which a part of the sensor enclosure 555 is disposed on one surface of the image sensor 551 at the side of the long side(s) LS1 and LS2, in the side of the short side SS1 or SS2 of the image sensor 551, the width W of the inactive region 551*b* may be sufficiently secured such that wire bonding is facilitated.

According to various embodiments, the sensor enclosure 555 may be disposed to surround at least a part of the image sensor 551 on one surface of the sensor substrate 553. For example, the sensor substrate 553 and the sensor enclosure 555 may be configured to provide a space configured to accommodate the image sensor 551, and may also be configured to protect the image sensor 551 from contamination by foreign materials. In an embodiment, the sensor enclosure 555 may provide an opening region 555*c* configured to allow external light to be incident to the image sensor 551, and the camera module 500 or the sensor assembly 505 may further include an optical element 559 (e.g., an infrared blocking filter) which is disposed in the opening region 555*c* of the sensor enclosure 555 so as to at least partially face the image sensor 551. For example, the optical element 559 may be configured to allow external light to be incident to the image sensor 551, and may be configured to seal the space provided by the sensor substrate 553 and the sensor enclosure 555. For example, the image sensor 551 may be configured to detect light incident through the optical element 559 substantially, and a part of the sensor enclosure 555 may be attached to one surface of the image sensor 551 configured to substantially face the optical element 559. In an embodiment, the optical element 559 may include an infrared blocking filter, and may be configured to block light (e.g., infrared rays) of a wavelength band detected by the image sensor 551 without being identified with the naked eye.

According to various embodiments, another part of the sensor enclosure 555 may be disposed on or attached to the sensor substrate 553 at a position adjacent to the short side(s) SS1 and SS2 of the image sensor 551. For example, the sensor enclosure 555 may be mechanically or physically coupled or fixed to the sensor substrate 553, and in a position adjacent to the long side(s) LS1 and LS2, the sensor enclosure 555 may be configured not to be in direct contact with one surface of the image sensor 551. In an embodiment, the camera module 500 or the sensor assembly 505 may further include a sealing member 555*a* to seal at least a part between the sensor enclosure 555 and the image sensor 551 and/or between the sensor enclosure 555 and the sensor substrate 553. In various embodiments, a part of the sensor enclosure 555 may be connected, attached, or disposed to one surface of the image sensor 551 by means of the sealing member 555*a*. In an embodiment, the sealing member 555*a* may be formed of an adhesive in a liquid state or a gel state. For example, although FIG. 9 illustrates the sealing member 555*a* having a designated shape, various embodiments of the disclosure may not be limited thereto. In an embodiment, by applying an adhesive in a liquid state or a gel state, a sealing structure (e.g., the sealing member 555*a*) may be formed or disposed between the sensor enclosure 555 and the image sensor 551 and/or between the sensor enclosure 555 and the sensor substrate 553.

According to various embodiments, in a position or a region in which a part of the sensor enclosure 555 is disposed on one surface of the image sensor 551, a part (e.g., the portion indicated as 'SF1' of FIG. 11) of the side surface of the image sensor 551 may be exposed to the outside through between a side surface (e.g., the portion indicated as 'SF2' in FIG. 11) of the sensor substrate 553 and a side surface (e.g., the portion indicated as 'SF3' in FIG. 11) of the sensor enclosure 555. For example, a portion of the side surfaces of the image sensor 551, which corresponds to (or is adjacent to) the first long side LS1 or the second long side LS2, may be exposed to the outside of the sensor enclosure 555. For example, when seen from a direction perpendicular to the second optical-axis O2 or when seen from the direction from the second surface (e.g., the second surface 210B of FIG. 3) toward the first surface (e.g., the first surface 210A of FIG. 2) of a housing, a part of the side surfaces of the image sensor 551 may be visually seen. In various embodiments, the camera module 500 or the sensor assembly 505 may further include at least one of an adhesive tape 555b so as to hide or protect a part (e.g., the side surface) of the image sensor 551, which is exposed to the outside. A configuration in which a part of the side surface of the image sensor 551 is exposed to the outside or a configuration in which the image sensor 551 is protected by the adhesive tape 555b, will be described in more detail through the embodiments of FIG. 11 to FIG. 14.

According to various embodiments, the wiring substrate 557 may be configured to substantially extend from the sensor substrate 553 and to be coupled to a main circuit board (e.g., the printed circuit board 340 of FIG. 4), and may include at least partially a flexible printed circuit board. For example, the sensor assembly 505 may be electrically connected to the main circuit board through the wiring substrate 557. In an embodiment, the wiring substrate 557 may include a first flexible region 557a (e.g., a first flexible printed circuit board) configured to extend from the sensor substrate 553, a rigid region 557b (e.g., a rigid printed circuit board) connected to one end of the first flexible region 557a, a second flexible region 557c (e.g., a second flexible printed circuit board) connected to one end of the rigid region 557b, and/or a connection member 557d (e.g., a connector) disposed at one end of the second flexible region 557c. The rigid region 557b may be utilized as a structure for standardizing the arrangement of the wiring substrate 557. For example, as illustrated in FIG. 7, the rigid region 557b may be disposed on a side surface different from a side surface, on which the sensor substrate 553 is disposed, on the camera housing 501, and the first flexible region 557a may be transformed into an appropriate shape between the sensor substrate 553 and the rigid region 557b so as to provide stable electrical wiring. The connection member 557d may be substantially coupled to a main circuit board (e.g., the printed circuit board 340 of FIG. 4) so as to be electrically connected to the main circuit board, and the second flexible region 557c is transformed into an appropriate shape between the rigid region 557b and the main circuit board so as to provide stable electrical wiring.

According to various embodiments, the camera module 500 or the sensor assembly 505 may be arranged on the electronic device 101, 102, 104, 200, 300, or 400 while the long sides LS1 and LS2 are substantially parallel to the X-axis or the Y-axis, and intersect with the Z-axis or the first optical-axis O1. According to an embodiment, the camera module 500 or the sensor assembly 505 may be arranged on the electronic device 101, 102, 104, 200, 300, or 400 while the short sides SS1 and SS2 are substantially parallel to the Z-axis, and intersect with the X-axis or the Y-axis. For example, the long sides LS1 and LS2 may be arranged side by side in the width direction or the longitudinal direction of the electronic device 101, 102, 104, 200, 300, or 400 so that the sensor assembly 505 or the image sensor 551 has a high design freedom degree with respect to the horizontal width thereof, and the short sides SS1 and SS2 may be arranged side by side in the thickness direction of the electronic device 101, 102, 104, 200, 300, or 400 so that the camera module 500 is easily mounted to the thinned electronic device 101, 102, 104, 200, 300, or 400. In various embodiments, the camera module 500 may have a folded structure (e.g., the reflective member 455 of FIG. 6). Therefore, it may be easy to secure a moving range or space of a lens(es) (e.g., the lens 453a, 453b, or 453c of FIG. 6) so that a telephoto function is easily implemented.

Figure 11:
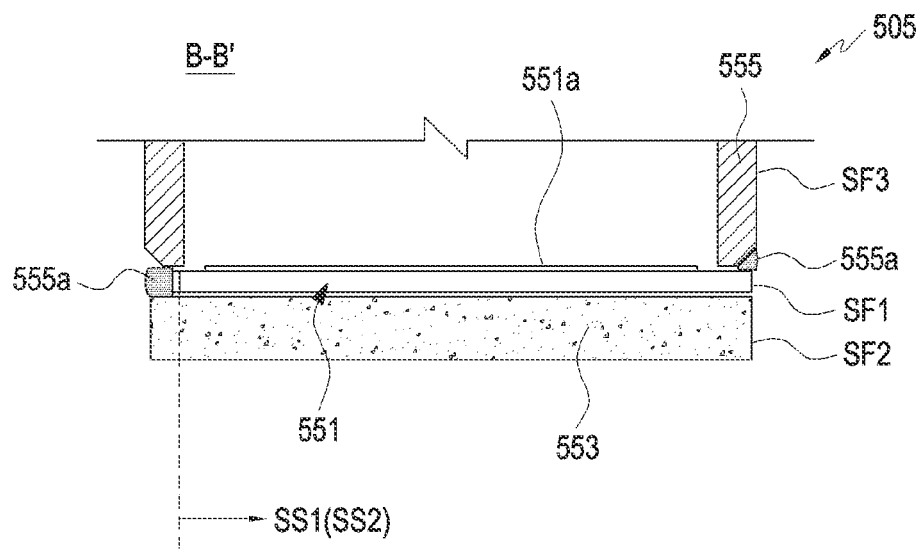
FIG. 11 is a sectional structural view of a sensor assembly of a camera module, taken along line B-B' of FIG. 8 according to various embodiments.
Figure 12:
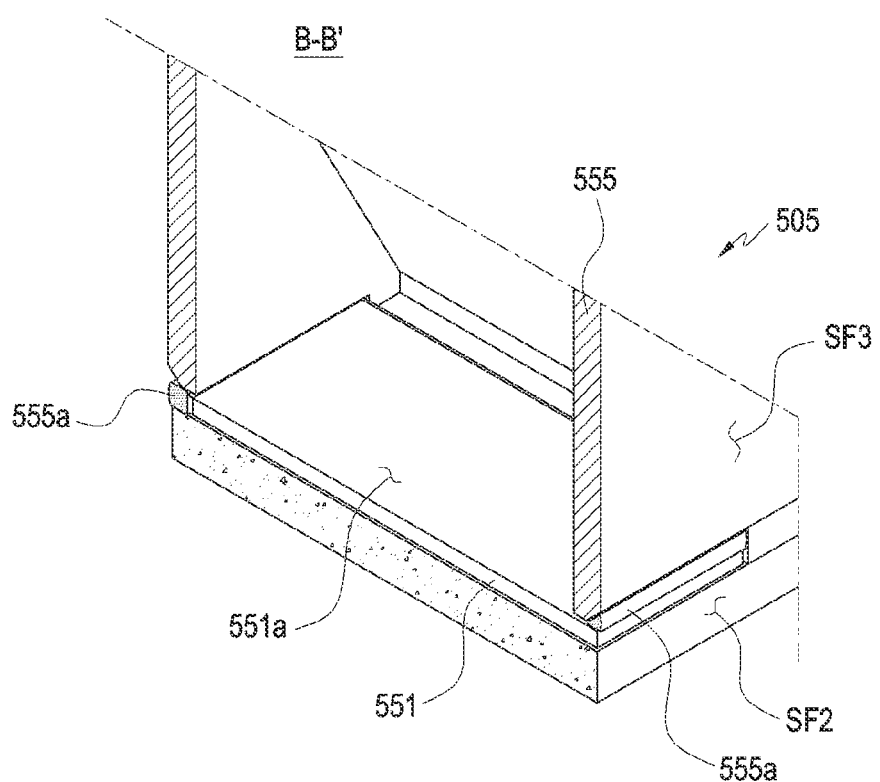
FIG. 12 is a cross-sectional perspective view of a sensor assembly of a camera module, taken along line B-B' of FIG. 8 according to various embodiments.

FIG. 11 is a sectional view of a sensor assembly 505 of a camera module (e.g., the camera module 500 of FIG. 7), taken along line B-B' of FIG. 8, according to various embodiments. FIG. 12 is a cross-sectional perspective view of a sensor assembly 505 of a camera module 500, taken along line B-B' of FIG. 8, according to various embodiments.

FIG. 11 and FIG. 12 illustrate the short side(s) SS1 or SS2 of the image sensor 551, and opposite ends of each of the short sides SS1 and SS2 may substantially correspond to the position of the long sides LS1 and LS2. Referring to FIG. 11 and FIG. 12, a part of the sensor enclosure 555 may be disposed on the edge of one surface of the image sensor 551, and may be configured not to be in direct contact with the image sensor 551. In an embodiment, a part SF1 (e.g., the portion adjacent to the long side of FIG. 10) of the side surfaces of the image sensor 551 may be exposed to the outside through between the side surface SF2 of the sensor substrate 553 and the side surface SF3 of the sensor enclosure 555. In various embodiments, the sealing member 555a may be disposed between the sensor enclosure 555 and one surface of the image sensor 551 and/or between the sensor enclosure 555 and the sensor substrate 553 so as to form a sealing structure, and according to an embodiment, the sealing member 555a may be configured to attach the sensor enclosure 555 to the image sensor 551 or the sensor substrate 553. In FIG. 11, it is illustrated that a part on the left part of the sensor enclosure 555 is misaligned with the image sensor 551 thereon, and in the case, the sealing member 555a may be disposed between the sensor enclosure 555 and the sensor substrate 553 so as to hide the side surface of the image sensor 551. For example, when seen from the outside, the sensor assembly 505, in one side surface thereof, may be configured to have a form in which the sensor enclosure 555, the sealing member 555a, the image sensor 551, and/or the surface of the sensor substrate 553 are successively arranged, and the sensor assembly 505, in the other side surface thereof, may be configured to have a form in which the sensor enclosure 555, the sealing member 555a, and/or the surface of the sensor substrate 553 are successively arranged.

Figure 13:
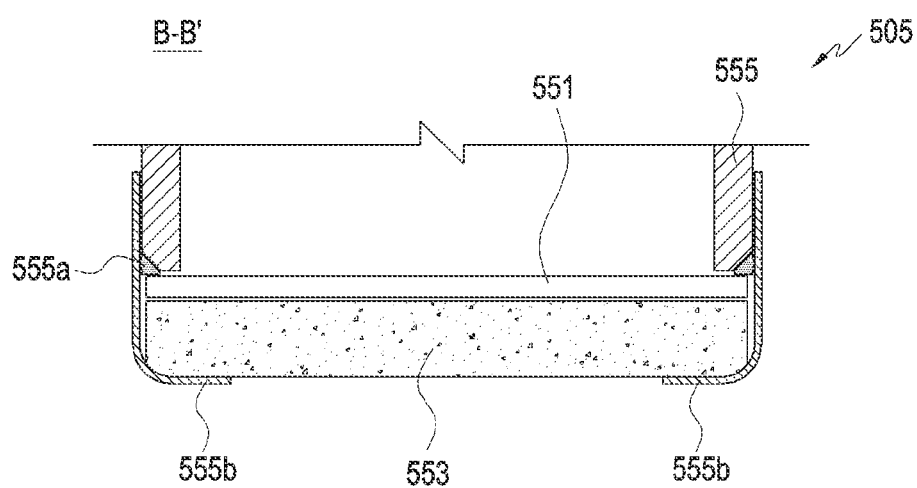
FIG. 13 is a sectional view of a sensor assembly of a camera module, taken along line B-B' of FIG. 8 according to various embodiments.
Figure 14:
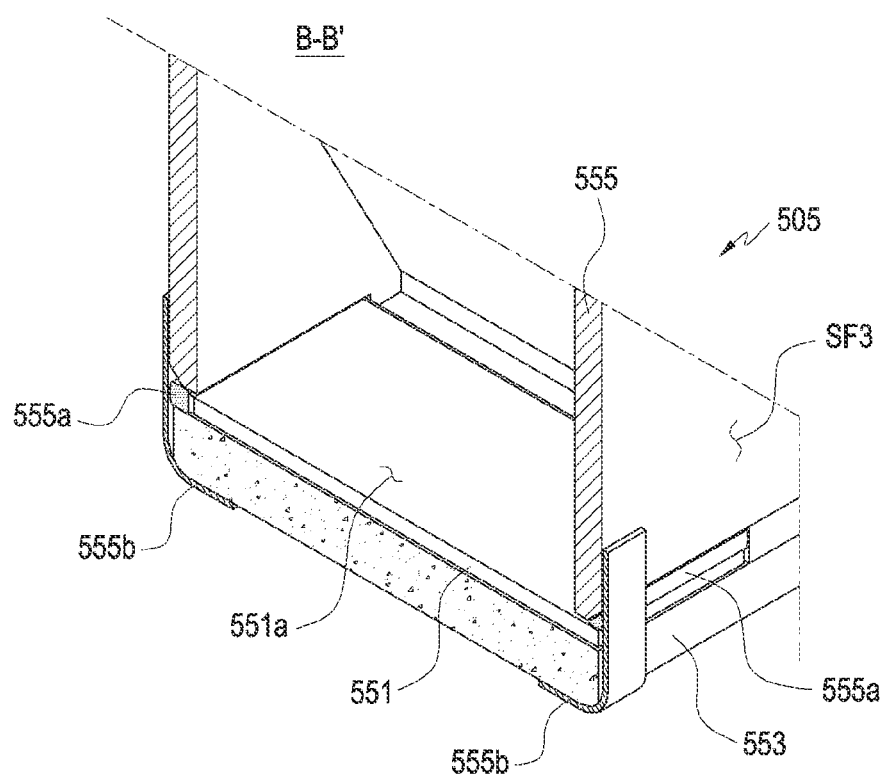
FIG. 14 is a cross-sectional perspective view of a sensor assembly of a camera module, taken along line B-B' of FIG. 8 according to various embodiments.

FIG. 13 is a sectional view of a sensor assembly 505 of a camera module (e.g., the camera module 500 of FIG. 7), taken along line B-B' of FIG. 8, according to various embodiments. FIG. 14 is a cross-sectional perspective view of a sensor assembly 505 of a camera module 500, taken along line B-B' of FIG. 8, according to various embodiments.

Referring to FIG. 13 and FIG. 14, a part of the sensor enclosure 555 may be substantially disposed on one surface of the image sensor 551, and a portion of the side surfaces of the image sensor 551, which corresponds to the long side (e.g., the long side LS1 or LS2 of FIG. 10), may be substantially exposed to an outer space through the gap between the sensor enclosure 555 and the sensor substrate 553. In the embodiment, the sealing member 555a may be configured to seal the gap between the sensor enclosure 555 and the image sensor 551. In an embodiment, the adhesive tape 555b may be attached from at least one side surface of the sensor enclosure 555 to the side surface of the sensor substrate 553, and a part of the adhesive tape 555b may be configured to hide the side surface of the image sensor 551 or to be attached to the side surface of the image sensor 551. Although the embodiment of FIG. 14 illustrates an example configuration in which the adhesive tape 555b is attached to a part of the side surface of the image sensor 551, which is exposed to the outside, but it should be noted that various embodiments of the disclosure are not limited thereto. For example, although exposed to the outside of the sensor enclosure 555, the adhesive tape 555b may be attached thereto so as to completely hide the side surface of the image sensor 551 from the outside of the sensor assembly 505.

Figure 15:
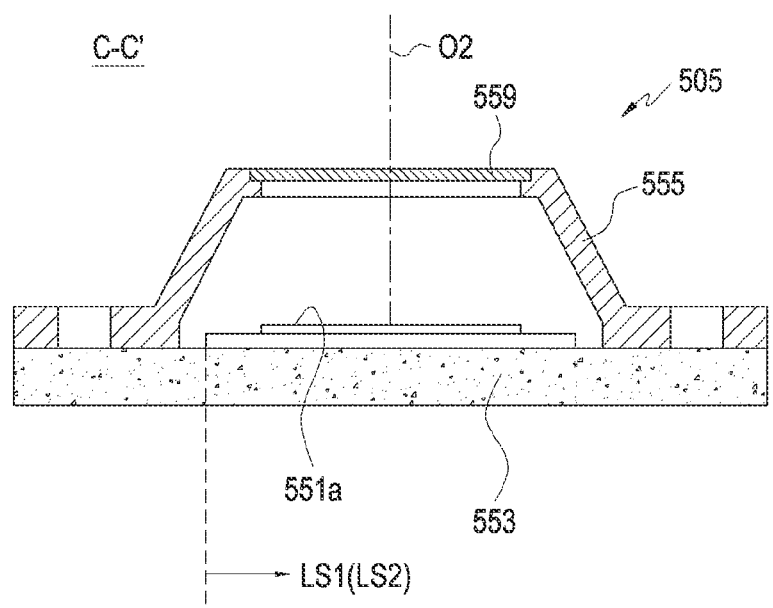
FIG. 15 is a sectional view of a sensor assembly of a camera module, taken along line C-C' of FIG. 8 according to various embodiments.

FIG. 15 is a sectional view of a sensor assembly 505 of a camera module (e.g., the camera module 500 of FIG. 7), taken along line C-C' of FIG. 8, according to various embodiments.

FIG. 15 illustrates the long side(s) LS1 or LS2 of the image sensor 551, and opposite ends of each of the long sides LS1 and LS2 may substantially correspond to the position of the short sides SS1 and SS2. Referring to FIG. 15, the sensor enclosure 555 may be substantially disposed or fixed to one surface of the sensor substrate 553 at a position adjacent to at least one of the short sides SS1 and SS2 of the image sensor 551. For example, a structure, which is configured to substantially dispose or fix the sensor enclosure 555, may be implemented on the sensor substrate 553. In an embodiment, the sensor enclosure 555 may be configured to seal or close a space in which the image sensor 551 is accommodated and configured not to be substantially in contact with the image sensor 551. In the structure in which a part of the sensor enclosure 555 is disposed on one surface of the image sensor 551, the sealing member 555a may be provided to form a sealing structure between the sensor enclosure 555 and the image sensor 551 or to attach the sensor enclosure 555 to the image sensor 551 in a state of not being in direct contact therewith.

A camera module (e.g., the camera module 500 of FIG. 7) or a sensor assembly (e.g., the sensor assembly 505 of FIG. 8 or FIG. 9) according to various example embodiments of the disclosure may be configured to provide a wire bonding region for the image sensor 551 in a direction (e.g., the X-axis direction or the Y-axis direction of FIG. 4) or a region having a high design freedom degree, and thus the image sensor or the camera module may be miniaturized in a portion (or a direction) subject to restriction in size such as the thickness direction (e.g., the Z-axis direction in FIG. 4 or FIG. 6) of an electronic device (e.g., the electronic device 101, 102, 104, 200, 300, or 400 of FIG. 1 to FIG. 6). For example, the wire bonding region is not disposed in the thickness direction (e.g., the upper side or the lower side of the active region 551a) of the electronic device 400, and the wire bonding region and the active region 551a may be arranged at the adjacent sides of each other along the width direction or the longitudinal direction of the electronic device 400 on the electronic device 400. In an embodiment, the sensor enclosure 555 is disposed on one surface of the image sensor 551 in a portion or a direction (e.g., the thickness direction of the electronic device 400 or the Z-axis direction of FIG. 6) subject to restriction in size, and thus the camera module 500 can be further miniaturized. For example, the camera module 500 according to various embodiments of the disclosure may be configured to provide an environment which allows multiple camera modules to be easily arranged in one electronic device. In addition, in an embodiment, when the camera module 500 has a folded structure including a reflective member (e.g., the reflective member 455 of FIG. 6), it may be easy to improve the telephoto function of the miniaturized or thinned electronic device 400.

According to various example embodiments of the disclosure, a camera module (e.g., the camera module 180, 405, 500 of FIG. 1, FIG. 6, or FIG. 7) and/or an electronic device (e.g., the electronic device 101, 102, 104, 200, 300, or 400 of FIG. 1 to FIG. 6) including same may include: a sensor substrate (e.g., the sensor substrate 553 of FIG. 7 to FIG. 9 or FIG. 11 to FIG. 15), an image sensor (e.g., the image sensor 451 or 551 of FIG. 6, FIG. 9, FIG. 10, or FIG. 11 to FIG. 15) disposed on one surface of the sensor substrate, a sensor enclosure (e.g., the sensor enclosure 555 of FIG. 8, FIG. 9, or FIG. 11 to FIG. 15) disposed on the sensor substrate surrounding at least a part of the image sensor, and an optical element (e.g., the optical element 559 of FIG. 8, FIG. 9, or FIG. 15) comprising a filter disposed in the sensor enclosure facing the image sensor, wherein the image sensor may be configured to detect light incident through the optical element, and the sensor enclosure may be attached to an edge of one surface (e.g., the surface on which the active region 551a of FIG. 10 is disposed) of the image sensor at least partially facing the optical element.

According to various example embodiments of the disclosure, the image sensor may include, on the edge of one surface thereof: a first long side (e.g., the first long side LS1 of FIG. 10) extending in a first direction and having a first length (e.g., the first length L1 of FIG. 10), a first short side (e.g., the first short side SS1 of FIG. 10) extending from one end of the first long side in a second direction intersecting with the first direction and having a second length (e.g., the second length L2 of FIG. 10) less than the first length, a second long side (e.g., the second long side LS2 of FIG. 10) extending from one end of the first short side in the first direction and having the first length, and a second short side (e.g., the second short side SS2 of FIG. 10) extending from one end of the second long side in the second direction to be connected to the other end of the first long side and having the second length, wherein on one surface of the image sensor, a part of the sensor enclosure may be attached to at least one of the first long side or the second long side.

According to various example embodiments of the disclosure, another part of the sensor enclosure may be attached to the one surface of the sensor substrate at a position adjacent to the first short side or the second short side.

According to various example embodiments of the disclosure, the camera module and/or the electronic device including may further include: a sealing member comprising a seal (e.g., the sealing member 555a of FIG. 8, FIG. 9, or FIG. 11 to FIG. 14) disposed between a part of the sensor enclosure and the one surface of the image sensor, wherein the sealing member may be configured to join a part of the sensor enclosure to the one surface of the image sensor or to seal a gap between a part of the sensor enclosure and the one surface of the image sensor.

According to various example embodiments of the disclosure, a portion (e.g., the portion indicated as 'SF1' in FIG. 11) of a side surface of the image sensor, corresponding to the first long side or the second long side, may be exposed between a side surface (e.g., the portion indicated as 'SF2' in FIG. 11) of the sensor substrate and a side surface (e.g., the portion indicated as 'SF3' in FIG. 11) of the sensor enclosure.

According to various example embodiments of the disclosure, the camera module and/or the electronic device including same may further include: an adhesive tape (e.g., the adhesive tape 555b of FIG. 8, FIG. 9, FIG. 13, or FIG. 14) attached to extend from a side surface of the sensor enclosure to a side surface of the sensor substrate, wherein a part of the adhesive tape may be attached to a side surface of the image sensor.

According to various example embodiments of the disclosure, the first long side and the first short side may be arranged to be perpendicular to each other.

According to various example embodiments of the disclosure, the camera module and/or the electronic device including same may further include: a reflective member having a reflective surface (e.g., the reflective member 455 of FIG. 6) configured to receive external light incident from the direction of a first optical-axis and refract or reflect the external light in a direction of a second optical-axis intersecting with the first optical-axis, and at least one lens (e.g., at least one of the lenses 453a, 453b, and 453c of FIG. 6) disposed between the reflective member and the image sensor along the direction of the second optical-axis and configured to guide or focus light refracted or reflected by the reflective member to the image sensor.

According to various example embodiments of the disclosure, the image sensor may include, on the edge of one surface thereof, a first long side extending in a first direction and having a first length, a first short side extending from one end of the first long side in a second direction intersecting with the first direction and having a second length less than the first length, a second long side extending from one end of the first short side in the first direction and having the first length, and a second short side extending from one end of the second long side in the second direction and connected to the other end of the first long side and having the second length, wherein on one surface of the image sensor, a part of the sensor enclosure may be attached to at least one of the first long side or the second long side.

According to various example embodiments of the disclosure, the first long side and the second long side may extend in a direction intersecting with the first optical-axis and successively arranged along the direction of the first optical-axis.

According to various example embodiments of the disclosure, the first short side and the second short side may be arranged to be parallel to the first optical-axis.

According to various example embodiments of the disclosure, when seen from a direction perpendicular to the second optical-axis, a portion of a side surface of the image sensor, corresponding to the first long side or the second long side, may be disposed between a side surface of the sensor substrate and a side surface of the sensor enclosure.

According to various example embodiments of the disclosure, the optical element may include an infrared blocking filter.

According to various example embodiments of the disclosure, an electronic device (e.g., the electronic device 101, 102, 104, 200, 300, or 400 of FIG. 1 to FIG. 6) may include: a housing (e.g., the housing 210 of FIG. 2) including a first surface (e.g., the first surface 210A of FIG. 1) facing a first direction and a second surface (e.g., the second surface 210B of FIG. 3) facing a second direction opposite to the first direction, and at least one camera module (e.g., the camera module 405 or 500 of FIG. 6 or FIG. 7) comprising a camera configured to detect light incident through one of the first surface or the second surface, wherein the at least one camera module may include a sensor substrate (e.g., the sensor substrate 553 of FIG. 7 to FIG. 9 or FIG. 11 to FIG. 15), an image sensor (e.g., the image sensor 451 or 551 of FIG. 6, FIG. 9, FIG. 10, or FIG. 11 to FIG. 15) disposed on one surface of the sensor substrate, a sensor enclosure (e.g., the sensor enclosure 555 of FIG. 8, FIG. 9, or FIG. 11 to FIG. 15) disposed on the sensor substrate surrounding at least a part of the image sensor, an infrared blocking filter (e.g., the optical element 559 of FIG. 8, FIG. 9, or FIG. 15) disposed in the sensor enclosure facing the image sensor, a reflective member (e.g., the reflective member 455 of FIG. 6) comprising a reflective surface configured to receive external light incident through one of the first surface or the second surface from the direction of a first optical-axis (e.g., the first optical-axis O1 of FIG. 6) and refract or reflect the external light in the direction of a second optical-axis (e.g., the second optical-axis O2 of FIG. 6) intersecting with the first optical-axis, and at least one lens (e.g., the at least one of the lenses 453a, 453b, and 453c of FIG. 6) disposed between the reflective member and the image sensor along the direction of the second optical-axis and configured to guide or focus light refracted or reflected by the reflective member to the image sensor, wherein the image sensor may be configured to detect light incident through the infrared blocking filter, and at least a part of the sensor enclosure may be attached to an edge of one surface of the image sensor facing the infrared blocking filter.

According to various example embodiments of the disclosure, the at least one lens may be configured to be moved along the direction of the second optical-axis so as to perform focal length adjustment or focus adjustment.

According to various example embodiments of the disclosure, the electronic device described above may further include a display (e.g., the display 201 or 330 of FIG. 2 or FIG. 4) disposed on the first surface, wherein the camera module may be configured to detect light incident through the second surface.

According to various example embodiments of the disclosure, the image sensor may include, on the edge of one surface thereof, a first long side (e.g., the first long side LS1 of FIG. 10) extending in a first direction and having a first length (e.g., the first length L1 of FIG. 10), a first short side (e.g., the first short side SS1 of FIG. 10) extending from one end of the first long side in a second direction intersecting with the first direction and having a second length (e.g., the second length L2 of FIG. 10) less than the first length, a second long side (e.g., the second long side LS2 of FIG. 10) extending from one end of the first short side in the first direction and having the first length, and a second short side (e.g., the second short side SS2 of FIG. 10) extending from one end of the second long side in the second direction to be connected to the other end of the first long side and having the second length, wherein on one surface of the image sensor, a part of the sensor enclosure may be attached to at least one of the first long side or the second long side.

According to various example embodiments of the disclosure, the first short side or the second short side may extend in a direction from the first surface toward the second surface.

According to various example embodiments of the disclosure, when seen from a direction from the second surface toward the first surface, a portion of a side surface of the image sensor, corresponding to the first long side or the second long side, may be disposed between a side surface of the sensor substrate and a side surface of the sensor enclosure.

According to various example embodiments of the disclosure, another part of the sensor enclosure may be attached to the sensor substrate at a position adjacent to the first short side or the second short side.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A camera module comprising:
    a sensor substrate;
    an image sensor disposed on one surface of the sensor substrate;
    a sensor enclosure disposed on the sensor substrate surrounding at least a part of the image sensor; and
    an optical element comprising a filter disposed in the sensor enclosure facing the image sensor,
    wherein the image sensor is configured to detect light incident through the optical element, and
    wherein at least a part of the sensor enclosure is attached to an edge of one surface of the image sensor facing the optical element such that a portion of a side surface of the image sensor is exposed to an outside of the sensor enclosure between a side surface of the sensor substrate and a side surface of the sensor enclosure.

2. The camera module of claim 1, wherein the image sensor comprises, on the edge of one surface thereof:
    a first long side extending in a first direction and having a first length;
    a first short side extending from one end of the first long side in a second direction intersecting with the first direction and having a second length less than the first length;
    a second long side extending from one end of the first short side in the first direction and having the first length; and
    a second short side extending from one end of the second long side in the second direction to be connected to the other end of the first long side and having the second length,
    wherein on the one surface of the image sensor, a part of the sensor enclosure is attached to at least one of the first long side or the second long side.

3. The camera module of claim 2, wherein another part of the sensor enclosure is attached to the one surface of the sensor substrate at a position adjacent to the first short side or the second short side.

4. The camera module of claim 2, further comprising:
    a seal disposed between a part of the sensor enclosure and the one surface of the image sensor,
    wherein the seal is configured to join the part of the sensor enclosure to the one surface of the image sensor or to seal a gap between the part of the sensor enclosure and the one surface of the image sensor.

5. The camera module of claim 2, wherein the portion of the side surface of the image sensor, exposed to the outside of the sensor enclosure, corresponds to the first long side or the second long side.

6. The camera module of claim 5, further comprising:
    adhesive tape attached to extend from the side surface of the sensor enclosure to the side surface of the sensor substrate,
    wherein a part of the adhesive tape is attached to the portion of the side surface of the image sensor.

7. The camera module of claim 2, wherein the first long side and the first short side are perpendicular to each other.

8. The camera module of claim 1, further comprising:
    a reflector comprising a reflective surface configured to receive external light incident from a direction of a first optical-axis and refract or reflect the external light in a direction of a second optical-axis intersecting with the first optical-axis; and
    at least one lens disposed between the reflector and the image sensor along the direction of the second optical-axis and configured to guide or focus light refracted or reflected by the reflector to the image sensor.

9. The camera module of claim 8, wherein the image sensor comprises, on the edge of the one surface thereof:
    a first long side extending in a first direction and having a first length;
    a first short side extending from one end of the first long side in a second direction intersecting with the first direction and having a second length less than the first length;
    a second long side extending from one end of the first short side in the first direction and having the first length; and
    a second short side extending from one end of the second long side in the second direction to be connected to the other end of the first long side and having the second length,
    wherein on one surface of the image sensor, a part of the sensor enclosure is attached to at least one of the first long side or the second long side.

10. The camera module of claim 9, wherein the first long side and the second long side extend in a direction intersecting with the first optical-axis and are arranged along the direction of the first optical-axis.

11. The camera module of claim 9, wherein the first short side and the second short side are parallel to the first optical-axis.

12. The camera module of claim 9, wherein, when viewed from a direction perpendicular to the second optical-axis, the portion of the side surface of the image sensor, exposed to the outside of the sensor enclosure, corresponds to the first long side or the second long side.

13. The camera module of claim 1, wherein the optical element comprises an infrared blocking filter.

14. An electronic device comprising:
    a housing comprising a first surface facing a first direction and a second surface facing a second direction opposite to the first direction; and
    at least one camera module comprising a camera configured to detect light incident through one of the first surface or the second surface,
    wherein each of the at least one camera module comprises:
        a sensor substrate;
        an image sensor disposed on one surface of the sensor substrate;

a sensor enclosure disposed on the sensor substrate surrounding at least a part of the image sensor;

an infrared blocking filter disposed in the sensor enclosure facing the image sensor;

a reflector comprising a reflective surface configured to receive external light incident through one of the first surface or the second surface from a direction of a first optical-axis and refract or reflect the external light in a direction of a second optical-axis intersecting with the first optical-axis; and at least one lens disposed between the reflector and the image sensor along the direction of the second optical-axis and configured to guide or focus light refracted or reflected by the reflector to the image sensor, wherein the image sensor is configured to detect light incident through the infrared blocking filter, and wherein at least a part of the sensor enclosure is attached to an edge of one surface of the image sensor facing the infrared blocking filter such that a portion of a side surface of the image sensor is exposed to an outside of the sensor enclosure between a side surface of the sensor substrate and a side surface of the sensor enclosure.

15. The electronic device of claim 14, wherein the at least one lens is configured to be movable along the direction of the second optical-axis for focal length adjustment or focus adjustment.

16. The electronic device of claim 14, further comprising:
a display disposed on the first surface of the housing,
wherein the camera module is configured to detect light incident through the second surface.

17. The electronic device of claim 14, wherein the image sensor comprises, on the edge of the one surface thereof:
a first long side extending in a first direction and having a first length;
a first short side extending from one end of the first long side in a second direction intersecting with the first direction and having a second length less than the first length;
a second long side extending from one end of the first short side in the first direction and having the first length; and
a second short side extending from one end of the second long side in the second direction to be connected to the other end of the first long side and having the second length,
wherein on one surface of the image sensor, a part of the sensor enclosure is attached to at least one of the first long side or the second long side.

18. The electronic device of claim 17, wherein the first short side or the second short side extend in a direction from the first surface of the housing toward the second surface of the housing.

19. The electronic device of claim 17, wherein, when viewed from a direction from the second surface of the housing toward the first surface of the housing, the portion of the side surface of the image sensor, exposed to the outside of the sensor enclosure, corresponds to the first long side or the second long side.

20. The electronic device of claim 17, wherein another part of the sensor enclosure is attached to the sensor substrate at a position adjacent to the first short side or the second short side.

* * * * *